4 Sheets--Sheet 2.

W. H. SEYMOUR & D. S. MORGAN.

Harvesters.

No. 135,731. Patented Feb. 11, 1873.

4 Sheets--Sheet 3.

W. H. SEYMOUR & D. S. MORGAN.
Harvesters.

No. 135,731.  Patented Feb. 11, 1873.

Witnesses:  Inventors:

4 Sheets--Sheet 4.
W. H. SEYMOUR & D. S. MORGAN.
Harvesters.
No. 135,731. Patented Feb. 11, 1873.
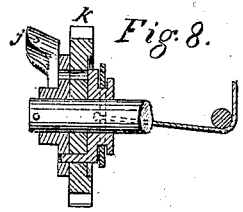
Fig. 8.
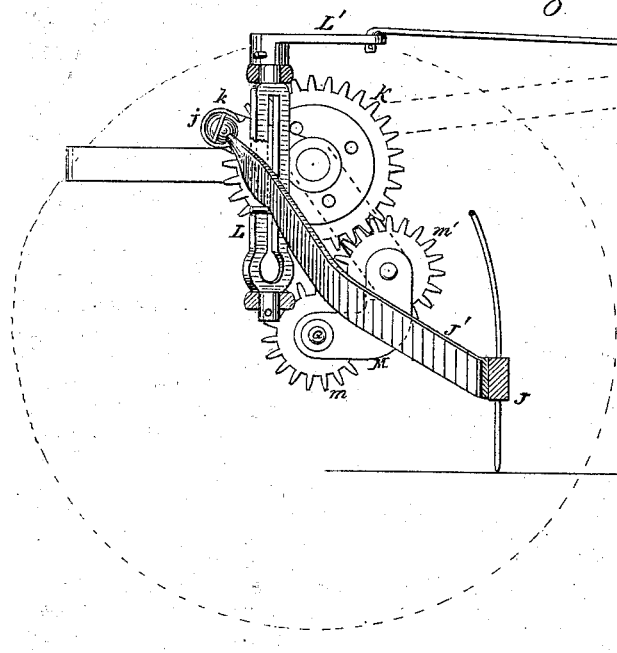
Fig. 5.
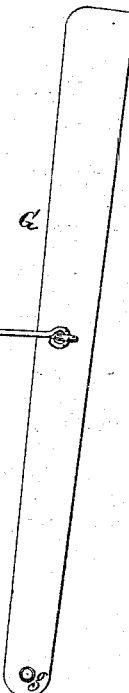
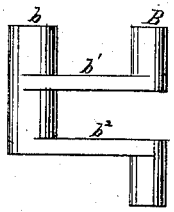
Fig. 7.
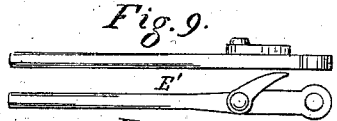
Fig. 9.
Fig. 10.
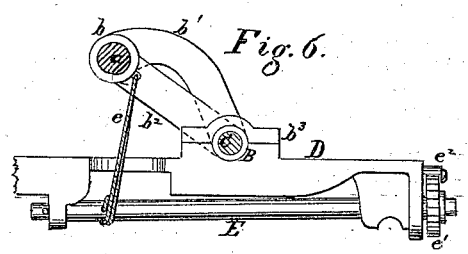
Fig. 6.
Witnesses: Inventors:
Jos. C. Peyton W. H. Seymour
E. C. Davidson D. S. Morgan
 By their Atty
 W. D. Baldwin
AM. PHOTO-LITHOGRAPHIC CO. N.Y.(OSBORNE'S PROCESS)

UNITED STATES PATENT OFFICE.

WILLIAM H. SEYMOUR AND DAYTON S. MORGAN, OF BROCKPORT, N. Y.

IMPROVEMENT IN HARVESTERS.

Specification forming part of Letters Patent No. 135,731, dated February 11, 1873.

*To all whom it may concern:*

Be it known that we, WILLIAM H. SEYMOUR and DAYTON S. MORGAN, both of Brockport, in the county of Monroe and State of New York, have invented certain new and useful Improvements in Harvesters, of which the following is a specification:

Our invention consists, first, in a reel so constructed as automatically to move forward above and in advance of the cutters, to reach into the standing grain, and then to move backward to sweep the cut grain back upon the platform away from the cutters; second, in the combination of a rotating reel moving backward and forward over the cutting apparatus with a side-delivery rake moving over the platform in circular curves to discharge therefrom the gavel deposited by the reel; third, in combining a vibrating rake, a turning-post through on which the rake-arm slides, and a crank-arm on a rotating shaft which drives the rake, whereby the rake is lifted clear of the gavel at the end of its stroke. Fourth, our improvements further consist in driving the rake by an idle-wheel interposed between the driving-gear on the axle from which the rake is driven and the gear which drives the rake, the idle-wheel being mounted in a frame swinging around the driving-axle to allow the cutters to be raised or lowered without deranging the gearing. Fifth, our improvement further consists in the combination of the main frame and driving-axle by means of a lifting-chain and windlass to raise or lower the cutters.

The accompanying drawing represents a fully-organized harvesting-machine, in which our improvements are embodied in the best form now known to us; obviously, however, some of said improvements may be used without the others, and in machines differing somewhat in construction from the one delineated. The details of construction of the various parts may also be modified in various well-known ways without departing from the spirit of our invention.

Figure 1:
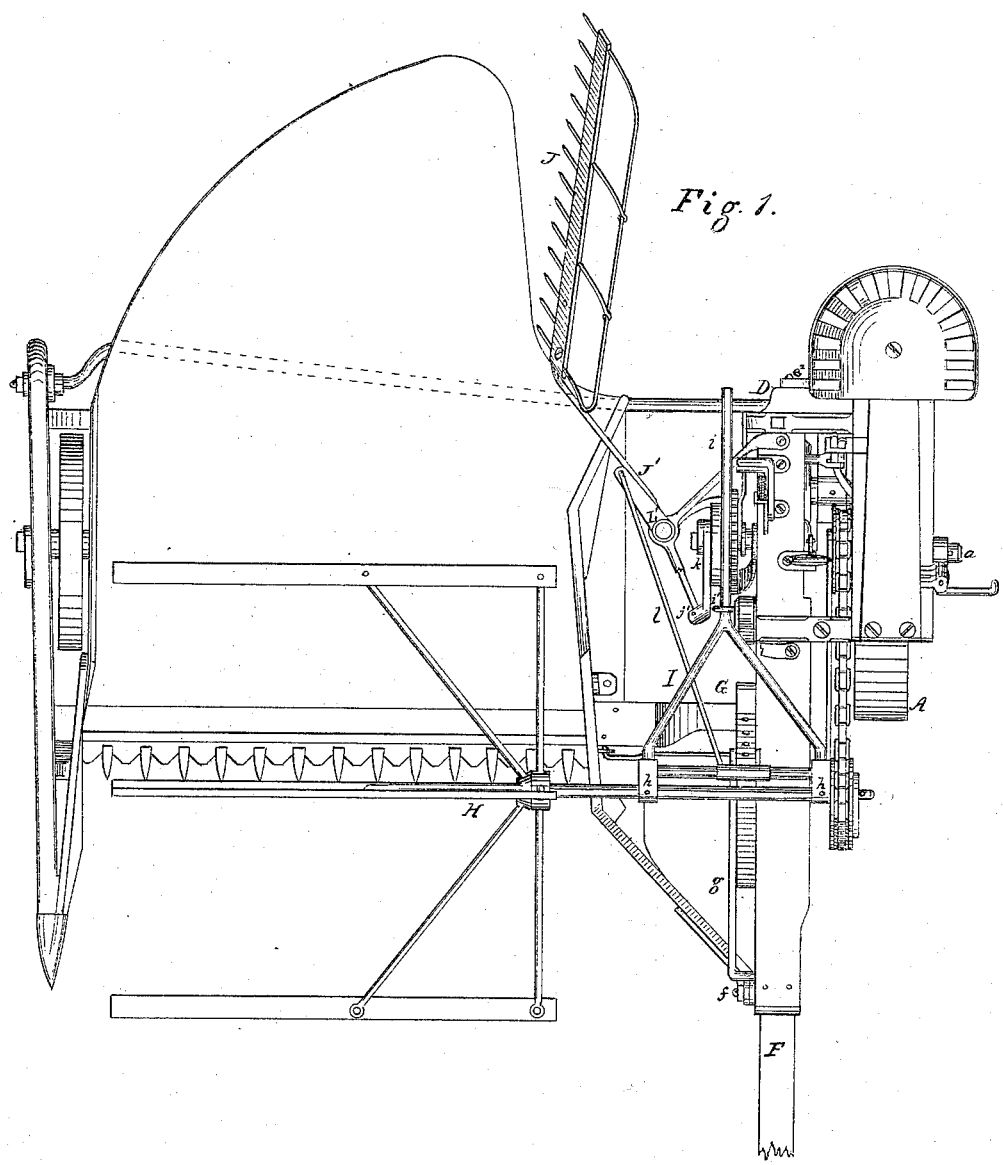
Figure 2:
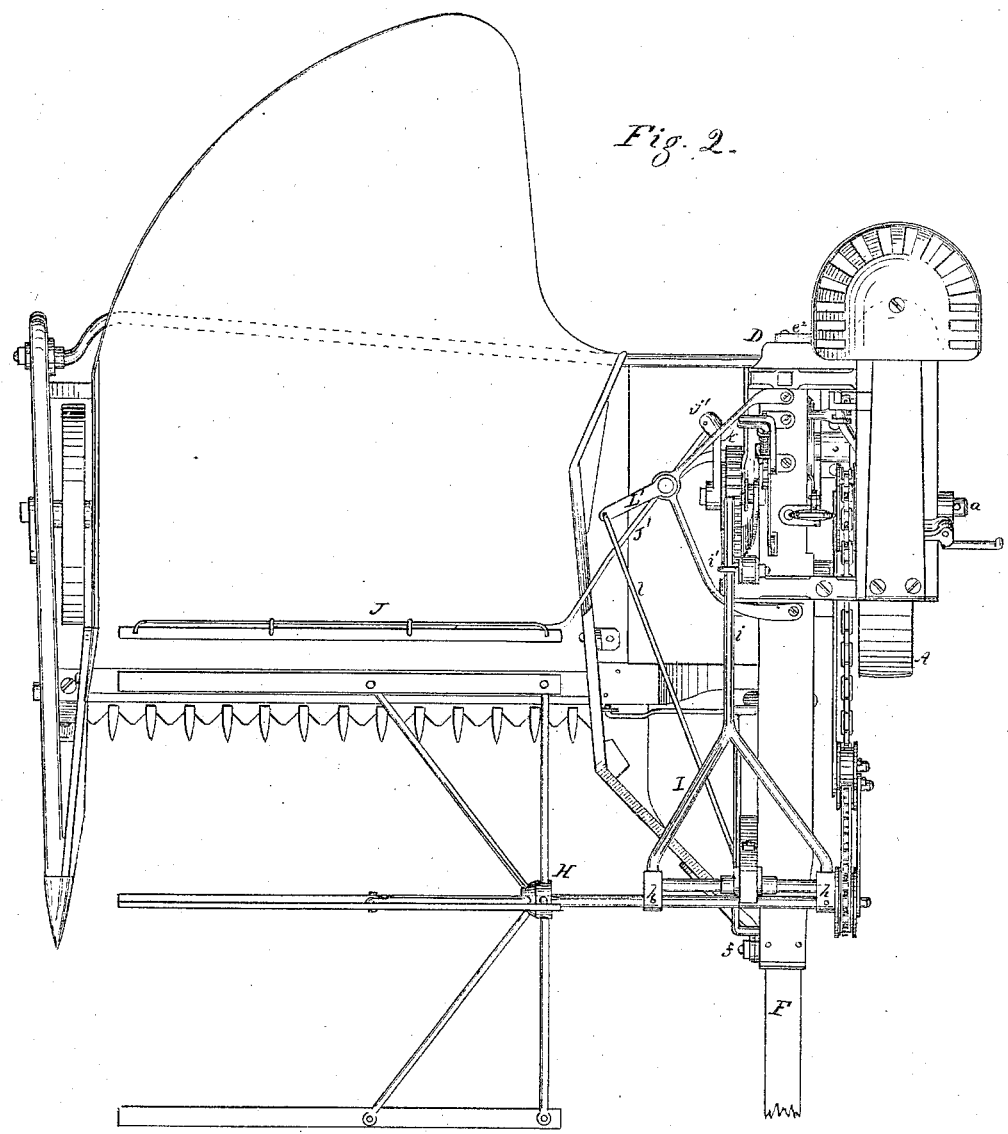
Figure 3:
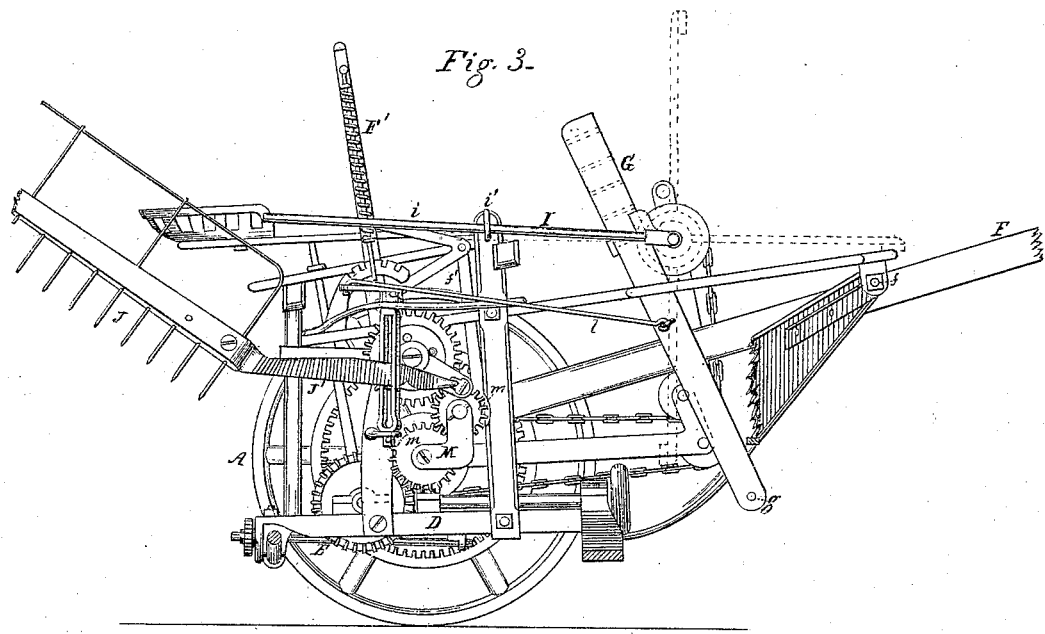
Figure 4:
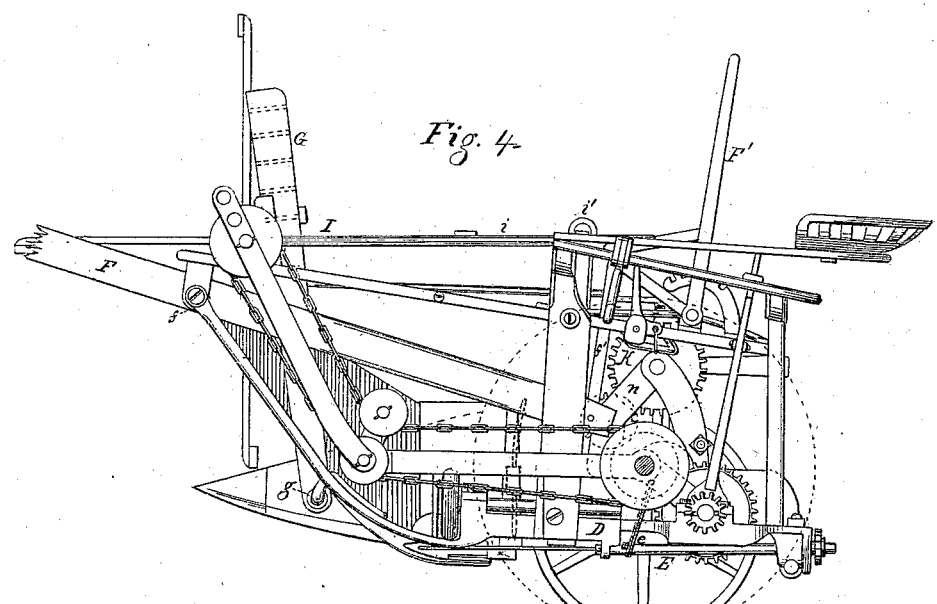

Figure 1 is a plan view of the machine, showing the reel drawn back over or nearly over the cutting apparatus, and the rake rising from the platform after having completed the discharge of the gavel. Fig. 2 is a similar view, showing the reel thrown forward into the standing grain, and the rake as fallen upon the front part of the platform to act upon the gavel swept back by the reel in its preceding backward movement. Fig. 3 represents a view in elevation of the inner side of the machine, with the parts in the relation shown in Fig. 1, the reel, inner fence, platform, frame, and cutting apparatus being removed to show the remaining parts more clearly. Fig. 4 represents a similar view of the opposite side of the machine with the driving-wheel and rake removed. Fig. 5 represents a view, partly in elevation and partly in section, on an enlarged scale, showing the details of the rake-driving mechanism and its connection with the reel-post. Fig. 6 represents a similar view of the devices for raising and lowering the machine. Fig. 7 represents a plan view of the frame connecting the main axle and main frame. Fig. 8 represents a vertical longitudinal section through the rake-driving shaft, showing the details of its clutching mechanism. Figs. 9 and 10 show details of the ratchet-lifting lever.

The drawing shows a main driving-wheel, A, turning upon a shaft, $a$, which revolves in a long pipe-box bearing, $b$, connected by arms $b^1$ $b^2$ with a pipe-bearing, B, in which the counter-shaft C revolves. The box B also rocks in suitable bearings $b^3$ on the main frame D, which is thus suspended by the swing-frame $b$ $b^1$ $b^2$ B from the main axle. A winding-shaft or windlass, E, arranged longitudinally beneath the main frame, is connected with the swing-frame by means of a cord or chain, $e$, which limits the descent of the main frame, and raises or lowers it as it is wound upon the shaft. This chain is wound upon the windlass by means of a pawl-lever, E', Figs. 9 and 10, acting upon a ratchet, $e^1$, on the winding-shaft, which is prevented from turning backward by a pawl, $e^2$, on the frame. The operation of this device in raising or lowering the frame will readily be understood without further description.

The machine is drawn by a tongue, F, fulcrumed to the main frame by a pivot-pin, $f$. The end of the tongue extends rearward, and is connected by a link, $f'$, with a suitable lifting-lever, F', within easy reach of the driver when in his seat.

These devices for rocking the main frame on its axle are not, however, claimed herein, being shown in prior patents of ours.

The machine is provided with suitable driving-gear, cutting apparatus, platform, divider, and supporting grain-wheel, unnecessary here to describe, being of well-known construction.

A reel-post, G, vibrates on a pivot, $g$, and moves in a guide-way, $g'$, parallel with the line of draft. A reel, H, rotates in bearings $h$ on a triangular bracing-frame, I, secured to the reel-post, and having a guide-piece, $i$, forming an extension thereof, which slides through a guide, $i'$, on the frame.

By this mode of construction the reel is capable of being moved forward in advance of the cutters to reel in the standing grain, and then of being drawn back over the cutters to sweep the cut grain back upon the platform, and elastic teeth or brushes may be used upon the beaters, the better to accomplish this latter purpose.

The reel is driven by sprocket-wheels and pulleys, or other equivalent devices, connected with the driving-power in a well-known way, so as to accommodate the vibrations of the reel without deranging the driving mechanism.

A rake, J, is mounted on an arm, J', connected by a swivel-joint, $j$, with a crank-arm, $k$, carried by a spur-wheel, K, rotating in suitable bearings in the main frame. The rake-arm slides through a slotted post, L, rocking in bearings projecting from the main frame. This slotted fulcrum-post is by preference placed in rear of the shaft which drives the rake, in order to obtain a slower movement of the rake in discharging the gavel, and a faster movement in moving forward to descend upon the fallen grain. It also enables the rake to fall parallel to the finger-beam. A crank, L', on the turning-post L is connected, by a link, $l$, with the vibrating reel-post G, the relation of the two being such that, as the rake moves forward to descend into the cut grain accumulated upon the platform, the reel is thrust forward to gather in the standing grain, and as the rake retracts the reel follows it, sweeping the grain back to the cutters, and, after it is severed, carrying it a short distance behind the cutters, where it is easily reached by the rake without its having to fall close to the cutting apparatus, as heretofore has been necessary with this class of rakes.

The drawing shows devices for throwing both the driving-gearing of the cutters and of the rake out of gear, each independently of the other; but detailed description of these parts is deemed unnecessary, as they may be varied in many ways.

In order to accommodate the changed relations of the parts in raising or lowering the main frame upon its axle, the rake is driven by a spur-pinion, $m$, upon the main axle, which pinion meshes into an idle-wheel, $m'$, in turn meshing into the rake-driving pinion K. The idle-wheel turns on a shaft mounted in bearings in a frame, M, pivoted on and swinging around the main axle, and connected by a radius-link, $n$, with the shaft of the rake-driving pinion K.

By this mode of construction, the idle-wheel rolls around both the gear-wheels $m$ and K to accommodate changes in their vertical relation, and yet always remains in gear with each.

The operation of the machine will readily be understood from the foregoing description.

We claim as our invention—

1. The combination of the rotating gathering-reel and mechanism, substantially such as described, for vibrating it, these members being constructed and operating in combination substantially as hereinbefore set forth, to cause the reel automatically to move forward in advance of the cutters to gather in the standing crop, and then to retract to sweep the cut grain behind the finger-beam.

2. The combination of the rotating reel moving backward and forward over the cutting apparatus and a side-delivery rake moving over the platform in unison with the reel, but in circular curves, substantially as set forth.

3. The combination of the slotted turning-post, the rotating driving-crank, and the rake-arm rocking in, turning with, and sliding through the post, these members being constructed and operating in combination substantially as set forth.

4. The combination of the rake-driving gear on the main axle, the driving-gear which carries the rake-arm, and the interposed idle-wheel mounted in a bearing swinging around the axes of both the gear-wheels above mentioned, substantially as set forth, to allow the machine to be raised or lowered without deranging the gearing.

5. The combination of the main driving-axle, the swing-frame, the main axle, the windlass, cord, and lever, substantially as set forth, to raise or lower the main frame.

In testimony whereof we have hereunto subscribed our names.

WM. H. SEYMOUR.
D. S. MORGAN.

Witnesses:
GEORGE H. ALLEN,
E. T. LAMB.